United States Patent [19]

Wada

[11] Patent Number: 5,090,250

[45] Date of Patent: Feb. 25, 1992

[54] ELECTROMAGNETIC FLOWMETER UTILIZING MAGNETIC FIELDS OF A PLURALITY OF FREQUENCIES

[75] Inventor: Ichiro Wada, Yokohama, Japan

[73] Assignee: Kabushiki Kaisha Toshiba, Kawasaki, Japan

[21] Appl. No.: 578,439

[22] Filed: Sep. 7, 1990

[30] Foreign Application Priority Data

Sep. 7, 1989 [JP] Japan ................................. 1-231896

[51] Int. Cl.⁵ .............................................. G01F 1/58
[52] U.S. Cl. ................................ 73/861.12; 73/861.16
[58] Field of Search ............. 73/861.12, 861.16, 861.17, 73/3, 195, 197

[56] References Cited

U.S. PATENT DOCUMENTS

| 4,206,641 | 6/1980 | Takada | 73/861.17 |
| 4,470,309 | 9/1984 | Wada | 73/861.12 |
| 4,644,799 | 2/1987 | Tomita | 73/861.17 X |

FOREIGN PATENT DOCUMENTS

| 3531869 | 3/1986 | Fed. Rep. of Germany. | |
| 1369090 | 10/1974 | United Kingdom. | |
| 2137360 | 10/1984 | United Kingdom | 73/861.16 |

OTHER PUBLICATIONS

ISA, 1988—Paper #88-1566/1-55617-139-0/88/12-59-1267/$0+.50PP "New Intelligent Magnetic Flowmeter with Dual Frequency Excitation".

Primary Examiner—Reinhard J. Eisenzopf
Assistant Examiner—E. L. Sopbell
Attorney, Agent, or Firm—Oblon, Spivak, McClelland, Maier & Neustadt

[57] ABSTRACT

An electromagnetic flowmeter has first and second magnetic field generating units. The first magnetic field generating unit applies a first magnetic field having a square wave of 4 to 8 Hz to a fluid to be measured. The second magnetic field generating unit applies a second magnetic field having a square wave of 25 to 35 Hz independently of the first magnetic field. A first electromotive force signal induced by the first magnetic field and a second electromotive force signal induced by the second magnetic field are detected by electrodes. A determination circuit determines whether the first electromotive force signal is normal and outputs a determination result. A first signal processing circuit generates a first flow rate signal on the basis of the first electromotive force signal. A second signal processing circuit generates a second flow rate signal on the basis of the second electromotive force signal. A calibration circuit outputs one of the first flow rate signal and the second flow rate signal calibrated by the first flow rate signal as a signal representing a flow rate of the fluid when the determination result represents a normal state, and outputs one of the second flow rate signal and the first flow rate signal calibrated by the second flow rate signal as a signal representing the flow rate when the determination result represents an abnormal state.

21 Claims, 5 Drawing Sheets

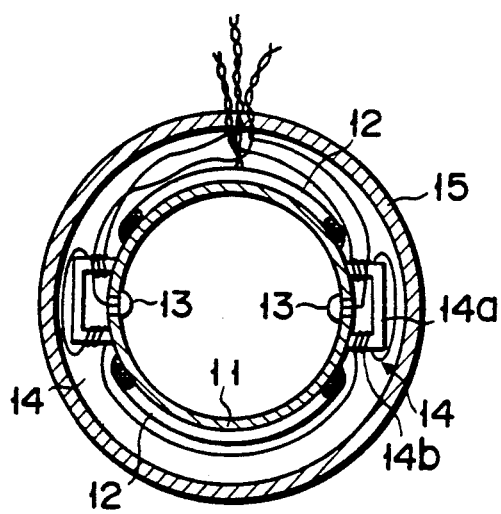
F I G. 1A
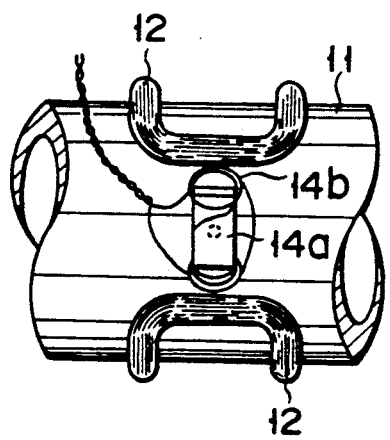
F I G. 1B
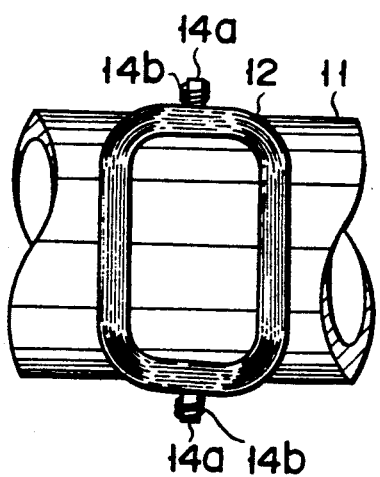
F I G. 1C

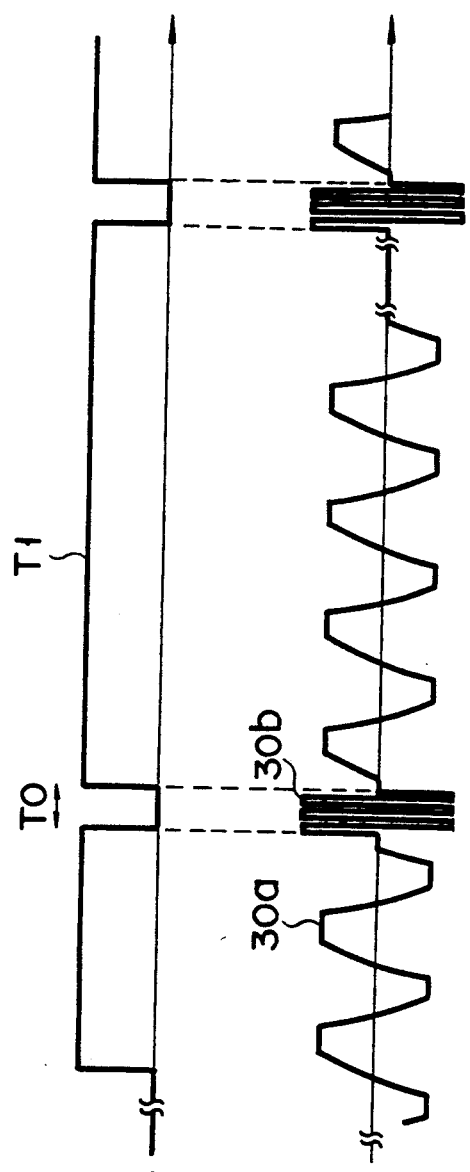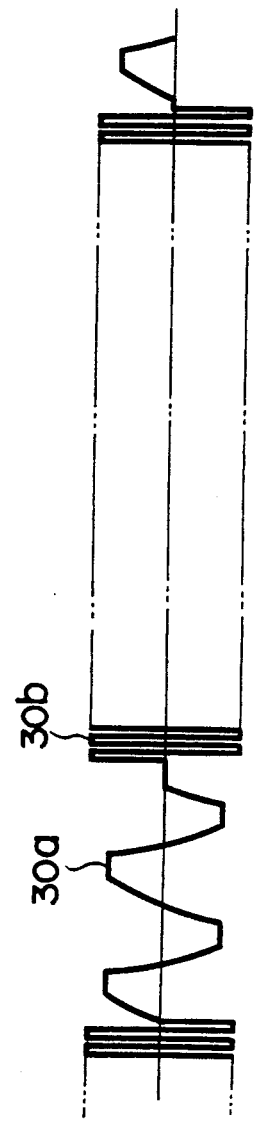
FIG. 3A
FIG. 3B
FIG. 8

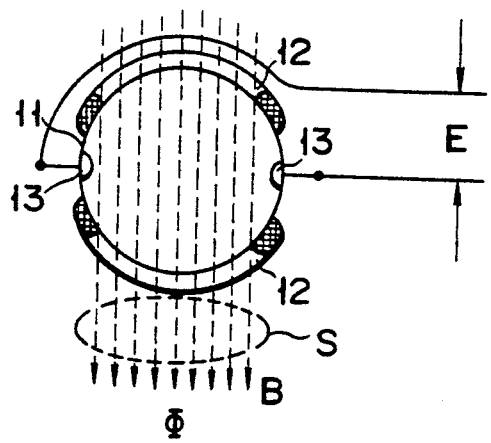
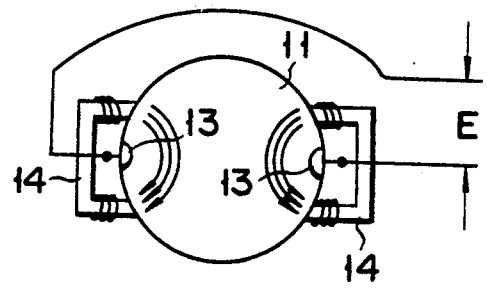
F I G. 4A
F I G. 4B
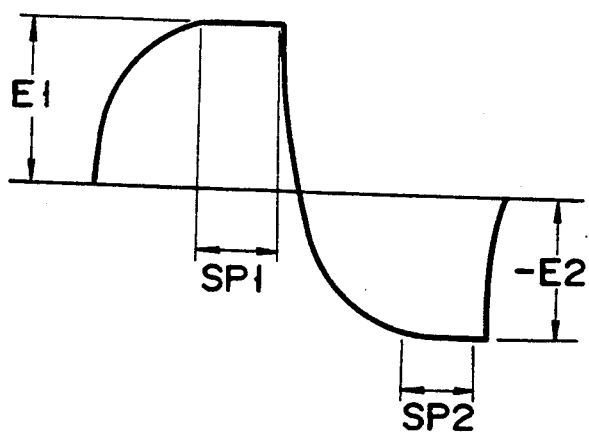
F I G. 5

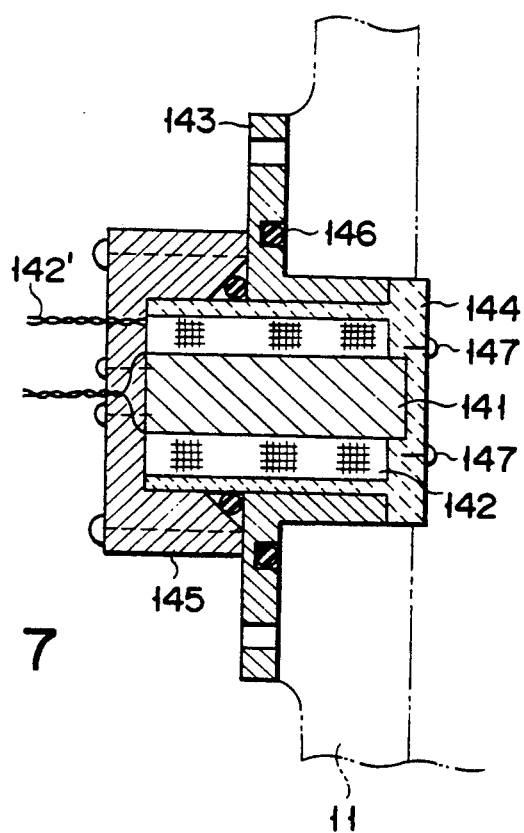
F I G. 7
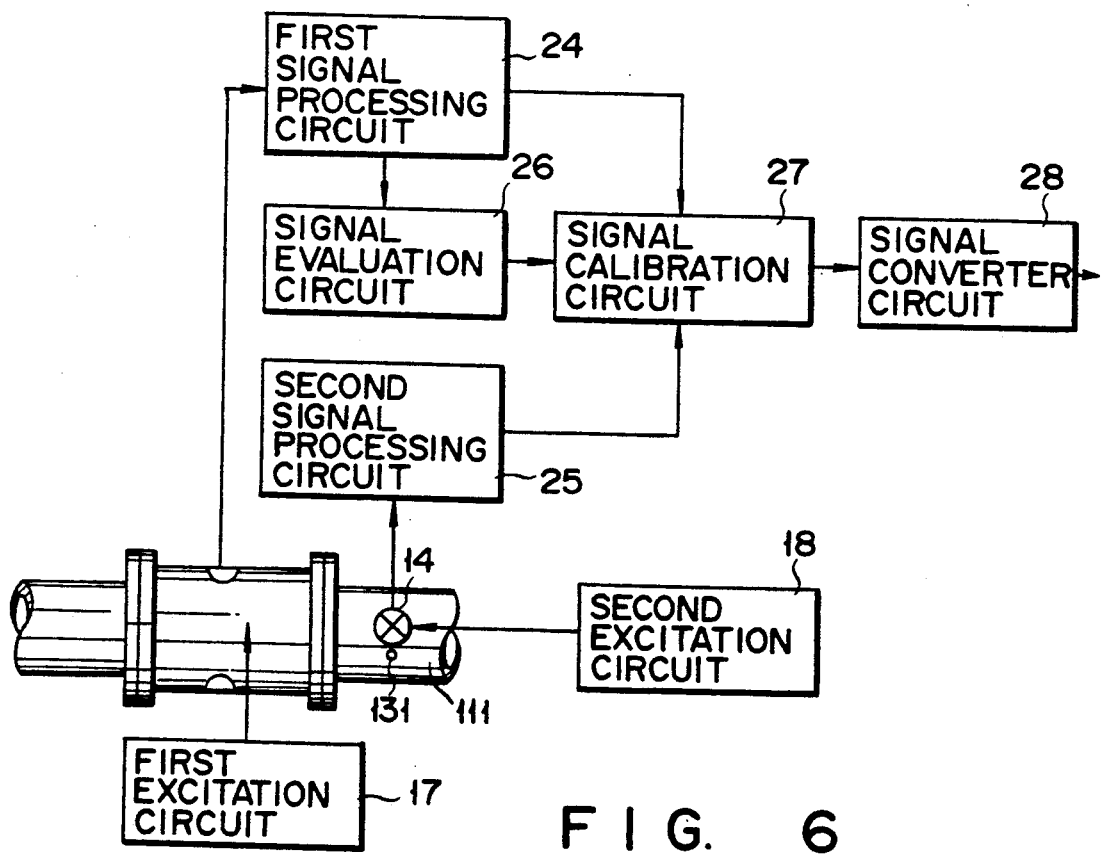
F I G. 6

ELECTROMAGNETIC FLOWMETER UTILIZING MAGNETIC FIELDS OF A PLURALITY OF FREQUENCIES

BACKGROUND OF THE INVENTION

1. Field of the Invention

The present invention relates to an electromagnetic flowmeter and, more particularly, to an electromagnetic flowmeter for relatively accurately measuring a flow speed or rate of a fluid to be measured regardless of a type of fluid and a diameter of a measuring pipe.

2. Description of the Related Art

An electromagnetic flowmeter generally measures a flow rate of a fluid by utilizing the Faraday's law.

In other words, when a magnetic field is applied to a conductive fluid flowing through a measurement tube, an electromotive force which is proportional to a flow rate of the fluid to be measured is generated.

By detecting the electromotive force, the flow speed and the flow rate of the fluid can be obtained.

In an industrial electromagnetic flowmeter, a fluid to be measured is usually a fluid containing an electrolyte. When a fluid contains an electrolyte, a kind of a battery is formed by electrochemical phenomenon on electrodes. An output voltage of the battery is larger than a voltage of the signal proportional to the flow rate. Therefore, an accurate electromotive force cannot be measured. For this reason, the electromagnetic flowmeter using the DC magnetic field cannot use for measuring a flow rate of a fluid containing an electrolyte.

In order to measure the flow rate of a fluid containing an electrolyte, an electromagnetic flowmeter for exciting a magnetic field generation coil by using a commercial AC power source is developed. In this electromagnetic flowmeter, however, variations in output signal levels caused by variations in zero point of the output signal may occur due to an AC phenomenon.

In order to eliminate the drawbacks of these conventional electromagnetic flowmeters, a flowmeter for exciting a magnetic field generation coil by using a square (rectangular) wave signal was developed. In this electromagnetic flowmeter, an electromotive force obtained in a stable area of a magnetic flux density B of a square wave magnetic flux is measured to obtain a flow rate of a fluid to be measured. In this electromagnetic flowmeter, an excitation frequency is low. Therefore, this electromagnetic flowmeter, however, is susceptible to noise having frequencies close to that of the magnetic field, e.g., noise called (1/f) noise and aliasing noise. It is possible to prevent noise by increasing an excitation frequency. When the frequency is increased, a rise time of a magnetic flux is undesirably prolonged due to an iron loss and the like. For this reason, an area where the magnetic field is kept stable is shortened. Therefore, the square wave magnetic flux behaves like an AC magnetic flux. The AC phenomenons which affect measurement precision are impaired. This drawback becomes more conspicuous in accordance with the increase of the diameter of the measurement pipe.

In order to eliminate the above drawback, a dual frequency excitation type electromagnetic flowmeter is proposed in "NEW INTELLIGENT MAGNETIC FLOWMETER WITH DUAL FREQUENCY EXCITATION", ISA, 1988-Paper #88-1566. In this electromagnetic flowmeter, a magnetic field excitation coil is driven by a signal obtained by superposing square wave excitation signals of a low frequency (about 6 Hz) and a high frequency (about 100 Hz) on each other. The electromotive force signal detected by the electrodes is separated into a signal induced by low-frequency excitation using a filter and a signal induced by high-frequency excitation. The separated signals are processed to obtain a flow rate.

In the magnetic flowmeter with dual frequency excitation in the above literature, a rise time of a magnetic flux of the high-frequency excitation signal is prolonged due to an iron loss. For this reason, an area where the magnetic flux is kept stable is shortened, the magnetic flux obtains AC characteristics and loses square wave characteristics. Therefore, an AC phenomenon for varying the zero point of the output signal also occurs. The drawback of the high-frequency excitation signal becomes more conspicuous in accordance with the increase of the diameter of the measuring pipe. In addition, unless a difference between the frequencies of the two excitation signals is large, the resultant flow rate signal cannot be accurately separated into two signals by using a filter.

It is, therefore, difficult for these conventional electromagnetic flowmeters to accurately measure a flow rate of a fluid to be measured.

SUMMARY OF THE INVENTION

The present invention has been made in consideration of the above situation, and has as its object to provide an electromagnetic flowmeter capable of accurately measuring a flow rate of a fluid.

It is another object of the present invention to provide an electromagnetic flowmeter capable of maintaining the nature of square wave excitation and accurately measuring a flow rate of a fluid regardless of a type of fluid and a diameter of a measuring pipe.

In order to achieve the above objects according to an aspect of the present invention, there is provided an electromagnetic flowmeter, comprising:

measuring pipe means through which a fluid to be measured flows;

first magnetic field generating means for forming a first magnetic field in the measuring pipe means by using a first square wave excitation signal;

second magnetic field generating means for forming a second magnetic field in the measuring pipe means by using a second square wave excitation signal having a frequency different from that of the first square wave excitation signal;

first detecting means for detecting a first electromotive force signal induced by the first magnetic field;

second detecting means for detecting a second electromotive force signal induced by the second magnetic field;

determining means for determining whether the first electromotive force signal is normal and outputting a determination result; and signal processing means for outputting a signal representing a flow rate of the fluid in accordance with the determination result in response to the first and second electromotive force signals.

In order to achieve the above objects according to a second aspect of the present invention, there is provided an electromagnetic flowmeter comprising:

path means through which a fluid to be measured flows;

first magnetic field generating means, having a first wiring and a first magnetic path, for generating a first magnetic field in the path means to generate a first electromotive force signal upon supply of a first excitation signal of a substantially square wave to the first winding;

second magnetic field generating means, having a second winding and a second magnetic path, for generating a second magnetic field in the path means to generate a second electromotive force signal upon supply of a second excitation signal of a substantially rectangular wave to the second winding, the first excitation signal having a frequency higher than the second excitation signal, the first and second magnetic fields being independently applied to the fluid to be measured, the second magnetic path having better magnetic characteristics than those of the first magnetic path, and the first and second electromotive force signals being substantially free from mutual interference;

means for independently detecting the first electromotive force signal induced by the first magnetic field and the second electromotive force signal induced by the second magnetic field;

means for determining whether the first electromotive force signal is normal and outputting a determination result;

first flow rate measuring means for generating a first flow rate designation signal representing a flow rate of the fluid on the basis of the first electromotive force signal;

second flow rate measuring means for generating a second flow rate designation signal representing a flow rate of the fluid on the basis of the second electromotive force signal; and calibrating means, responsive to the determination result from the determining means, for outputting a signal representing the flow rate of the fluid on the basis of the first and second flow rate designation signals.

According to the first aspect of the present invention, the first and second flow rate designation signals are obtained by utilizing the frequency characteristics of the square wave excitation signals having different frequencies. In addition, since the determining means determines whether the first electromotive force signal is normal, and the signal processing means outputs the signal representing the flow rate in accordance with the determination result. Therefore, the flow rate or speed of the fluid to be measured can be accurately measured.

According to the second aspect of the present invention, since the characteristics of the second magnetic path are better than those of the first magnetic path although the second frequency is higher than the first frequency, the second magnetic field has a waveform relatively closer to the square wave. Since the first and second magnetic fields are independently applied to the fluid to be measured, it is very easy to separate the electromotive force signals induced by both the magnetic fields. In addition, the determining means determines whether the first electromotive force signal is normal. The calibrating means outputs the signal representing the flow rate in accordance with the determination result. Therefore, the flow rate or speed of the fluid to be measured can be accurately measured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a sectional view showing a structure of a flow rate measuring pipe portion of an electromagnetic flowmeter according to the first embodiment of the present invention;

FIG. 1B is a side view of the measuring pipe portion shown in FIG. 1A;

FIG. 1C is a plan view of the measuring pipe portion shown in FIG. 1A;

FIG. 3A is a timing chart showing operation control signals output from an operation instruction circuit shown in FIG. 2;

FIG. 3B is a timing chart showing waveforms of magnetic flux waveforms applied to the fluid to be measured;

FIG. 4A is a view for explaining a magnetic field generated by a main magnetic field generating unit;

FIG. 4B is a view for explaining a magnetic field generated by an auxiliary magnetic field generating unit FIG. 5 is a view showing a one-wave flow rate signal;

FIG. 6 is a view showing an arrangement of an electromagnetic flowmeter according to the second embodiment of the present invention;

FIG. 7 is a sectional view showing another arrangement of an auxiliary magnetic field generating coil; and FIG. 8 is a timing chart showing other magnetic fields applied to the fluid to be measured.

DETAILED DESCRIPTION OF THE PREFERRED EMBODIMENTS

Figure 2:
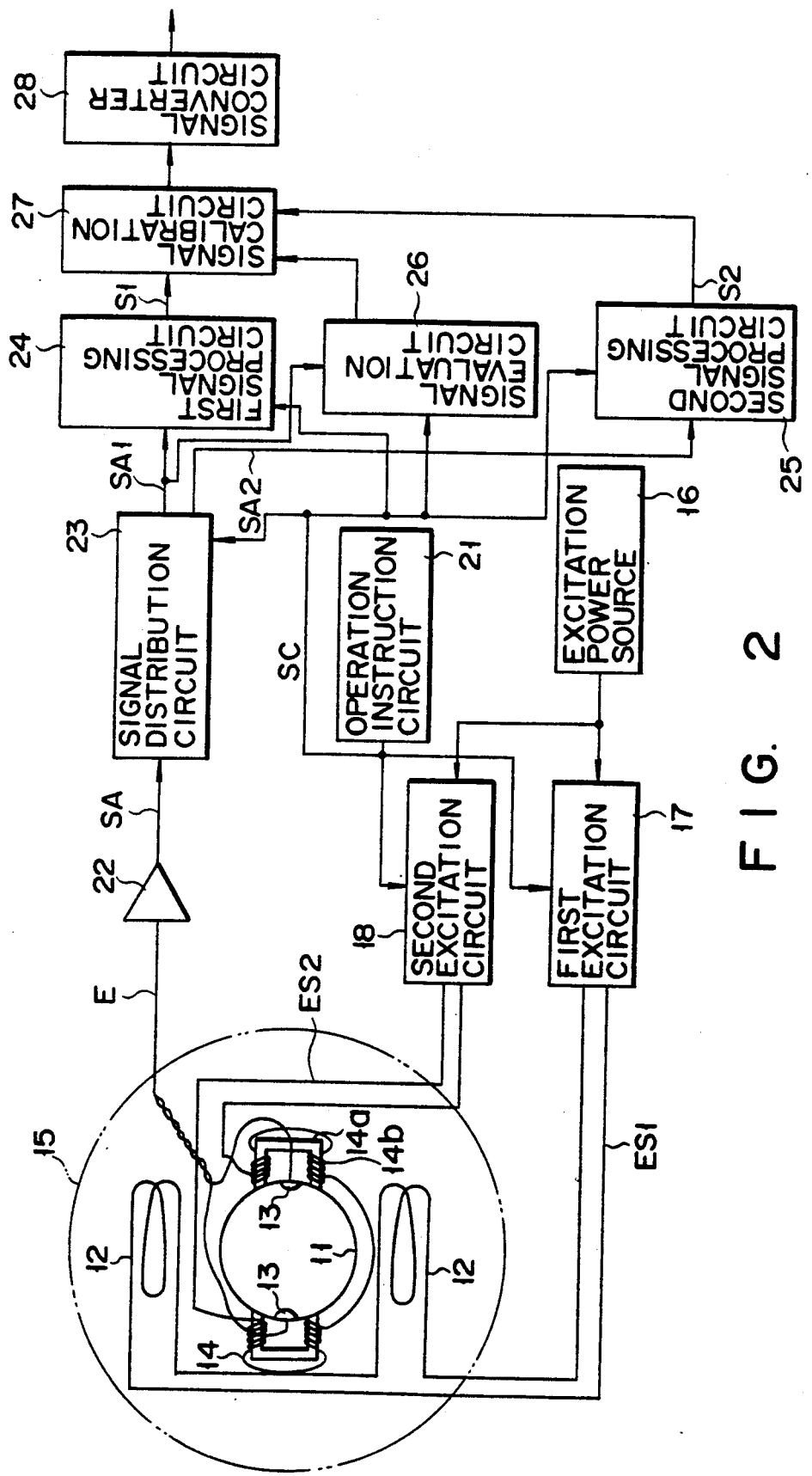
FIG. 2 is a block diagram showing a circuit arrangement of the electromagnetic flowmeter.

An electromagnetic flowmeter according to an embodiment of the present invention will be described with reference to the accompanying drawings.

A structure of a measuring pipe portion of a flowmeter according to this embodiment will be described with reference to FIGS. 1A to 1C.

A measuring pipe 11 through which a fluid to be measured flows consists of a magnetically permeable material. The measuring pipe 11 is fixed in the pipe and has a diameter (inner diameter) of 500 mm. A main magnetic field generating coil 12 is arranged to oppose the outer wall of the measuring pipe 11. In this embodiment, the main magnetic field generating coil 12 comprises a saddle coil. The main magnetic field generating coil 12 generates a main magnetic field to obtain a flow rate signal almost free from an eccentric flow included in the fluid to be measured and its flow state.

The direction of the magnetic field generated by the main magnetic field generating coil 12 is perpendicular to the direction of movement of the fluid to be measured in this embodiment. A pair of signal electrodes 13 are located on a line which crosses the axis of the measuring pipe 11 and is perpendicular to the direction of the magnetic field generated by the main magnetic field generating coil 12 and the direction of movement of the fluid to be measured. Since the signal electrodes 13 detect electromotive force signals induced by the fluid to be measured, the electrodes 13 are mounted on the inner wall of the measuring pipe 11.

An auxiliary magnetic field generating coil 14 is arranged at a position which does not overlap the position of the main magnetic field generating coil 12 mounted on the outer wall of the measuring pipe 11 in this embodiment. In the layout shown in FIGS. 1A to 1C, the auxiliary magnetic field generating coil 14 is located at a position so as to interpose the outer electrode 13. The auxiliary magnetic field generating coil 14 comprises a U-shaped iron core 14a and a coil 14b wound around the iron core 14a. The U-shaped iron core 14a consists of an iron core material having a small loss such as a small iron loss (e.g., a laminated core or an amorphous iron core), or steel. The auxiliary magnetic field generating coil 14 generates an auxiliary magnetic field to obtain a flow rate signal almost free from (1/f) noise and aliasing noise.

The measuring pipe 11, the coils 12 and 14, and the like are protected by an outer casing 15. The outer casing 15 consists of steel and also serves as a magnetic path for the magnetic flux generated by the main magnetic field generating coil 12.

An example of circuits for outputting an excitation signal, detecting a flow rate signal, and processing the flow rate signal will be described with reference to FIG. 2.

An excitation power source 16 includes a DC power source and supplies a power to first and second excitation circuits 17 and 18 to excite the excitation coils 12 and 14.

Each of the first and second excitation circuits 17 and 18 comprises a switching circuit for switching a DC power supplied from the excitation power source 16 and outputting a square wave excitation signal.

The switching circuit in the first excitation circuit 17 is controlled in response to a signal from an operation instruction circuit 21 (to be described in detail later) and generates a first low-frequency square wave excitation signal ES1. In the following description, the frequency of the excitation signal ES1 is set to be about 6 Hz. The excitation signal ES1 is supplied to the main magnetic field generating coil 12.

The switching circuit in the second excitation circuit 18 is controlled in response to a signal from the operation instruction circuit (to be described in detail later) 21 and generates a second low-frequency square wave excitation signal ES2 having a frequency of 25 Hz to 35 Hz higher than the first low-frequency. In the following description, the excitation signal ES2 has a frequency of about 30 Hz. The excitation signal ES2 is supplied to the auxiliary magnetic field generating coil 14.

The main magnetic field generating coil 12, the excitation power source 16, the first excitation (signal generating) circuit 17 constitute a main magnetic field generating unit. The main magnetic field generating unit applies a square wave magnetic field having a frequency of about 6 Hz to the entire sectional portion including the electrodes of the measuring pipe as shown in FIG. 4.

On the other hand, the auxiliary magnetic generating coil 14, the excitation power source 16, and the second low-frequency excitation signal generating u it 18 constitute an auxiliary magnetic field generating unit. The auxiliary magnetic field generating unit generates a rectangular wave magnetic field having a frequency of about 30 Hz at part of the sectional portion including the electrodes 13 of the measuring pipe 13.

The operation instruction circuit 21 includes an internal clock and outputs an operation control signal SC whose level is changed every predetermined period of time. When the operation control signal SC is set at high level, the first excitation circuit 17 is operated. However, when the operation control signal SC is set at low level, the second excitation signal generating circuit 18 is operated.

An electromotive force signal E induced in the fluid by the magnetic field generated by the main or auxiliary magnetic field generating unit is detected by the pair of electrodes 13.

The electromotive force signal E detected by the electrodes 13 is supplied as a flow rate signal SA to a signal distribution circuit 23 through an amplifier 22. The signal distribution circuit 23 comprises a switching circuit having a plurality of terminals and switching a signal output terminal in response to the control signal. This switching circuit responds to the operation control signal SC from the operation instruction circuit 21. When the operation instruction signal SC is set at high level, the switching circuit supplies the 6-Hz flow rate signal SA1 to a first signal processing circuit 24 and a signal evaluation circuit 26. When the operation control signal SC is set at low level, the switching circuit supplies the 30-Hz flow rate signal SA2 to the second signal processing circuit 25.

The first and second signal processing circuits 24 and 25 comprise sync circuits, sample/hold circuits, and subtracters and are alternately operated in response to the operation control signal SC and output signals representing the flow rates.

More specifically, when the operation control signal SC from the operation instruction circuit 21 is set at high level, the first signal processing circuit 24 is operated to receive the 6-Hz flow rate signal SA1 from the signal distribution circuit 23 and synchronizes it with the flow rate signal SA. The first signal processing circuit 24 then samples the flow rate signal SA1 during an area when the signal level of the flow rate signal SA1 is kept stabilized, i.e., time intervals SP1 and SP2 in FIG. 5. The first signal processing circuit 24 subtracts the sampled negative signal level from the positive signal level obtained by sampling after a half the period has elapsed from the positive signal level. Even if DC noise and the like are superposed on the flow rate signal SA1, the DC noise and the like components are canceled to each other. In the case shown in FIG. 5, a signal level is obtained as an E1+E2 signal. The signal levels of the signal from the first signal processing circuit 24 are averaged, and the average value is output as a signal S1 to a signal calibration circuit 27. The signal S1 represents a flow rate measured on the basis of the electromotive force signal E induced by the main magnetic field. When the operation control signal SC goes to low level and supply of the flow rate signal SA1 from the signal distribution circuit 23 to the first signal processing circuit 24 is kept interrupted, the first signal processing circuit 24 keeps outputting the signal S1 output during the high-level period of the operation control signal SC.

The second signal processing circuit 25 is operated when the operation control signal SC from the operation instruction circuit 21 is set at high level. The second signal processing circuit 25 receives a 30-Hz flow rate signal from the signal distribution circuit 23 and synchronizes it with the flow rate signal SA2. The second signal processing circuit 25 samples the flow rate signal during a period when the signal level of the flow rate signal SA2 is kept stabilized, e.g., the time intervals SP1 and SP2 in FIG. 5. The second processing circuit 25 then subtracts the negative signal level from the positive signal level obtained by sampling when a half the period of the sampled signal has elapsed from the positive signal level. The second signal processing circuit 25 averages the signal levels of the signals and outputs the average value as a signal S2. The signal S2 represents a flow rate measured based on the electromotive force signal E induced by the auxiliary magnetic field. The signal S2 is supplied to a signal calibration circuit 27. When the operation control signal SC goes to high level and supply of the flow rate signal from the signal distribution circuit 23 to the second signal processing circuit 25 is kept interrupted, the second signal processing circuit 25 keeps outputting the signal SC output during the low-level period of the operation control signal SC.

The signal evaluation circuit 26 comprises, e.g., a sync circuit, a differentiator, a comparator, and a reference voltage generator. The signal evaluation circuit 26 is operated when the operation control signal SC is set at high level and determines whether the 6-Hz flow rate signal SA1 supplied from the signal distribution circuit 23 is normal. The signal evaluation circuit 26 supplies a signal representing a determination result to the signal calibration circuit 27. Note that the signal evaluation circuit 26 keeps outputting an immediately preceding determination result signal during a low-level period of the operation control signal SC. More specifically, the signal evaluation circuit 26 differentiates a signal level during a period when the signal level of the flow rate signal SA1 is kept stabilized, i.e., in the range between the time intervals SP1 and SP2 in FIG. 5. The signal evaluation circuit 26 compares the differentiated value with a reference value. When the differentiated value is almost zero (i.e., $dA1/dt \approx 0$), the signal evaluation circuit 26 evaluates that the signal SA1 is normal. However, when the differentiated value falls outside the predetermined range ($dA1/dt \neq 0$), the circuit 26 evaluates that the signal SA1 is abnormal and outputs a signal representing the evaluation result.

The signal calibration circuit 27 comprises an equalizer. When the signal calibration circuit 27 receives a signal representing the normal state of the signal SA1 from the signal evaluation circuit 26, the signal calibration circuit 27 amplifies the signal S2 so that the signal level of the signal S1 coincides with that of the signal S2. The signal calibration circuit 27 outputs a calibrated signal from the second processing circuit 25 in the normal state. When the signal calibration circuit 27 receives a signal representing the abnormality of the signal SA1 from the signal evaluation circuit 26, the signal calibration circuit 27 outputs the signal S2 from the second signal processing circuit 25, for example, without any processing (without any calibration operation).

A signal converter circuit 28 converts the signal from the signal calibration circuit 27 into a signal representing a flow rate or speed, e.g., a pulse signal or a digital signal, and outputs the converted signal.

An operation of the electromagnetic flowmeter having the above arrangement will be described below.

The operation instruction circuit 21 outputs the operation control signal SC shown in FIG. 3A. The period and waveform of the operation instruction signal can be arbitrarily set in accordance with the type of fluid to be measured and the diameter of the measuring pipe. FIG. 3A shows a case wherein a high-level period of the signal SC is set to be about 2 sec, and its low-level period is set to be about 0.1 sec. The first and second excitation circuits 17 and 18 are alternately operated in response to the signal SC in this embodiment and the excitation signals are alternately supplied to the main and auxiliary magnetic field coils 12 and 14, thereby applying the magnetic field having waveforms shown in FIG. 3B to the fluid to be measured.

In order to facilitate understanding, assume a timing T1 in FIG. 3A. The operation control signal SC is set at high level, and the first excitation circuit 17 is operated. Since the excitation signal output from the first excitation circuit 17 is a low-frequency signal having a frequency of about 6 Hz, the rise time of the magnetic flux is relatively short, and a magnetic field having a waveform close to the square wave can be generated. For this reason, noise having the nature of magnetic flux differential value as a function of time ($dB/dt$) is not much generated. The zero point of the output signal becomes stable regardless of the size of the diameter of the measuring pipe 11. As shown in FIG. 4A, since a magnetic field is formed in the almost entire sectional area including the electrodes 13 of the measuring pipe 11, the flow rate can be measured without being adversely affected by the eccentric flow and the flow state. However, the induced signal is susceptible to an influence of so-called 1/f noise.

Upon application of the magnetic field of the 6-Hz square wave to the fluid to be measured, the 6-Hz electromotive force signal E is induced in the fluid to be measured. This electromotive force signal E is detected by the electrodes 13 and is amplified by the amplifier 22. The amplified signal is supplied to the signal distribution circuit 23.

The signal distribution circuit 23 supplies the flow rate signal SA to the first processing circuit 24 and the signal evaluation circuit 26 in response to the control signal SC.

The first signal processing circuit samples the signal supplied from the signal distribution circuit 23 at timings represented by SP1 and SP2 in FIG. 5. The first signal processing circuit 24 subtracts the negative signal level from the positive signal level obtained by sampling when a half the period of the sampled signal has elapsed from the positive signal level. For example, in the waveform shown in FIG. 5, an output is given as $E1 - (-E2) = E1 + E2$. By this subtraction processing, when DC noise is superposed on the flow rate signal, the DC noise components are canceled to each other. The levels of the resultant signal are averaged by the first signal processing circuit 24. The average value is output to the signal calibration circuit 27.

The signal evaluation circuit 26 differentiates the signal level of the signal SA1 during an area when the level of the signal SA1 is relatively kept stabilized. When the differentiated value is close to zero, the signal evaluation circuit 26 outputs a signal representing that the signal SA1 is normal. Otherwise, the signal evaluation circuit 26 outputs a signal representing abnormality of the signal SA1.

During the time interval T1, since the operation control signal SC is set at high level, the second signal processing circuit 25 does not perform signal processing. However, the second signal processing circuit 25 keeps outputting the signal S2 output during the time interval T0.

In response to a high-level signal from the signal evaluation circuit 26, the signal calibration circuit 27 amplifies the signal S2 so that the levels of the signals S1 and S2 coincide with each other when the evaluation signal represents the normal state. The amplified signal S2 is supplied to the signal converter circuit 28. However, when the evaluation signal represents abnormality, the signal S2 is supplied to the signal converter circuit 28, for example, without any processing.

The signal converter circuit 28 converts the input signal into, e.g., a digital signal and outputs it.

Assume that a fluid to be measured is a slurry, and that a large amount of 1/f noise is contained in an electromotive force signal induced by the main magnetic field. In this case, the signal evaluation circuit 26 determines that dS1/dt is not equal to zero. For this reason, the signal evaluation circuit 26 outputs a signal representing abnormality of the signal SA1. In response to this signal, the signal calibration circuit 27 outputs the output signal S2 from the second signal processing circuit 25 to the signal converter circuit 28. The frequency of the auxiliary magnetic field is as relatively high as 30 Hz, and the signal S2 contains a small amount of 1/f noise. In addition, since the auxiliary magnetic field generating unit uses a high-quality core material and generates a magnetic field in part of the measuring pipe 11, a magnetic field has a waveform relatively close to the square wave even if the diameter of the measuring pipe is large. For this reason, even if the signal S2 is used as an output from the signal calibration circuit 27, the flow rate can be relatively accurately measured.

Assume that a fluid to be measured includes an eccentric flow. The main magnetic field passes the entire sectional area of the fluid to be measured. For this reason, the electromotive force signal induced by the main magnetic field is almost free from an influence of the eccentric flow or the like. In this case, when the evaluation circuit 26 evaluates that the signal SA is normal, the signal S2 which has received the influence of the eccentric flow can be calibrated by the signal S1 free from the influence of the eccentric flow. For this reason, even if the signal S2 is influenced by the eccentric flow, a measured value is accurate.

Assume that time has elapsed and the level of the operation control signal SC goes to low level. The operation of the first excitation circuit 17 is stopped, and the second excitation circuit 18 starts supplying the excitation signal ES2 to the auxiliary excitation coil 14. The auxiliary excitation coil 14 is formed by using a compact, relatively high-quality iron core 14b and generates a magnetic field within a relatively narrow area. For this reason, although the excitation frequency is as relatively high as about 30 Hz, the rise time of the magnetic flux can be shortened and a magnetic field having a waveform close to the square wave can be obtained regardless of the diameter of the measuring pipe 11. For this reason, noise having the nature of the magnetic flux differentiated as a function of time (dB/dt) which tends to be generated using a high-frequency magnetic field is not much generated. The zero point of the electromotive force signal E is kept stabilized. This point will be further described with reference to mathematical expressions. The electromotive force signal E appearing across the pair of electrodes 13 is expressed by equation (1) below:

$$E = -(d\Phi/dt) \quad (1)$$

where $\Phi$ is the magnetic flux generated by the magnetic field generating unit, S is the effective area through which the magnetic flux $\Phi$ passes, and B is the magnetic flux density.

The magnetic flux $\Phi$ is represented by equation (2) below:

$$\Phi = S \cdot B \quad (2)$$

The electromotive force signal E is decomposed into noise and a signal as equation (3). In equation (3), the first component is the noise component and the second component is the signal component.

$$E = -\{S \cdot (dB/dt) + B \cdot (ds/dt)\} \quad (3)$$

When a magnetic field has a short rise time, the magnetic flux has a long constant period, and dB/dt = dk/dt = 0. Only the signal component having no noise can be extracted. If noise is mixed by other factors, condition dB/dt = 0 is established. Further, the zero point noise ($d^2B/dt^2$) caused by the eddy current in the metal parts also becomes about zero, thereby stabilizing the zero point.

The detected electromotive force signal is supplied to the second signal processing circuit 25 through the signal distribution circuit 23. The signal supplied to the second signal processing circuit 25 is processed, and the signal S2 is output. At this time, the first signal processing circuit 24 and the signal evaluation circuit 26 do not perform signal processing. The first signal processing circuit 24 and the signal evaluation circuit 26 keep outputting signals obtained during the high-level period of the signal SC. For this reason, in response to the signal output from the signal evaluation circuit 26, the signal calibration circuit 27 amplifies the signal S2 so that the signal levels of the signals S1 and S2 coincide with each other when the evaluation signal represents the normal state. The amplified signal S2 is supplied to the converter 28. When the evaluation signal represents abnormality, the signal S2 is supplied to the converter 28.

The above operation is repeated in accordance with levels of the operation control signal SC.

According to this embodiment, the characteristics of the two low-frequency magnetic fields are enhanced to compensate for the drawbacks of the respective magnetic fields, thereby measuring a flow rate of the fluid to be measured. The magnetic field applied to the fluid to be measured is not limited to the one shown in FIG. 3B but can be arbitrarily determined in accordance with the type of fluid to be measured and the diameter of the measuring pipe. For example, the magnetic field may be applied to the fluid to be measured, as shown in FIG. 8.

According to this embodiment, two magnetic flux having two frequencies are applied to the fluid. However, magnetic flux having three or more frequencies may be applied to the fluid to be measured.

Since the signal distribution circuit 23 is operated in response to the control signal from the operation instruction circuit 21, the induced signals can be clearly separated from each other even if the frequencies of the two excitation signals are relatively close to each other.

The present invention is not limited to the particular embodiment described above. Various changes and modifications may be made within the spirit and scope of the invention.

In the above embodiment, the main and auxiliary excitation units are fixed in one measuring pipe. The pair of electrodes 13 detect the electromotive force signals induced by the main magnetic field and the electromotive force signal induced by the auxiliary magnetic field. However, the main and auxiliary excitation units may be fixed in different pipes, and an electrode for detecting an electromotive force signal induced by the main magnetic field may be arranged separately from an electrode for detecting an electromotive force signal induced by the auxiliary magnetic field.

FIG. 6 shows an arrangement of such an electromagnetic flowmeter. Referring to FIG. 6, a main magnetic field generating coil and an electrode 13 are arranged in a measuring pipe 11, and an auxiliary magnetic field generating coil 14 and an electrode 131 are arranged in a pipe 111 connected to the measuring pipe 11. For this reason, even if a 6-Hz magnetic field and a 30-Hz magnetic field are simultaneously generated, they are not interfered with each other. For this reason, in this embodiment, first and second excitation circuits 17 and 18 and the coils 12 and 14 are always operated. The electromotive force signals detected by the electrode 14 and 131 are supplied to the first and second processing circuits 24 and 25 and the signal evaluation circuit 26, which circuits are also kept operated.

When the arrangement shown in FIG. 6 is employed and the pipe 131 having the auxiliary magnetic field generating coil 14 and the electrode 131 is connected to a conventional electromagnetic flowmeter, the same effect as in the above embodiment can be obtained.

An arrangement of the auxiliary excitation coil 14 and the electrode, which is suitably applied in the system shown in FIG. 6, will be described with reference to FIG. 7.

FIG. 7 shows an auxiliary excitation coil which can be inserted into a measuring pipe 11. Referring to FIG. 7, a coil 142 is wound around an iron core 141 constituted by ferrite, iron, etc. A 30-Hz rectangular excitation signal is supplied from a second excitation circuit 18 to a lead wire 142' of the coil 142. A resin 144 is molded on the inner surface and the coil periphery of the iron core 141 so as to cover the auxiliary magnetic field coil 14. A flange 143 is fixed to the resin 144 to fix the auxiliary magnetic field generating coil 14 to the side wall of the measuring pipe 11. The outer surface of the coil is in contact with the outer surface of the iron core 141 and the flange 143 and is protected by a feedback magnetic path 145 which covers the iron core 141 and the flange 143. Reference numeral 146 denotes an O-ring packing. A pair of auxiliary electrodes 147 are arranged at a predetermined interval on a surface of the auxiliary magnetic field generating coil 14 which is inserted into the measuring pipe 11. The electromotive signal E induced between the auxiliary electrodes 147 is supplied to a second signal processing circuit 25 through an amplifier 22 and a signal classification circuit 23. In the arrangement of FIG. 7, the auxiliary excitation unit and the auxiliary electrodes can be attached to the pipe by forming only a hole matching with the flange in the side surface of the pipe.

The arrangements of the coils 12 and 14 are not limited to the above embodiments. For example, the coil 12 may comprise a conventional coil having a yoke. In addition, the coil 14 may generate a magnetic field not to part of the sectional area of the measuring pipe 11 but to the entire area thereof.

The excitation power source 16 may output an AC signal. In this case, the excitation circuits 17 and 18 process the AC signal to generate an excitation signal having a rectangular wave.

In each embodiment described above, the two excitation circuits 17 and 18 are used. However, one or a plurality of excitation circuits which change a switching speed in response to a control signal from the operation instruction circuit 21 may be used.

The signal distribution circuit 23 need not be used. For example, the output signal from the amplifier 22 may be directly supplied to the signal processing circuits 24 and 25 and the signal evaluation circuit 26, and the operations of the circuits 24, 25, and 26 may be switched in response to a control signal from the operation instruction circuit 21.

The signal processing circuits 24 and 25 may comprise any conventional circuits if they can process flow rate signals having a square wave.

Various techniques for determining whether a signal is normal are known. The signal evaluation circuit 26 may employ any technique except for the one described in the above embodiments. For example, the signal evaluation circuit 26 (1) analyzes a frequency of an input signal and determines whether the analyzed frequency falls within a predetermined allowable range, (2) determines whether an amplitude or peak of an input signal falls within a predetermined range, or (3) determines a fluctuation in a signal of "0" level falls within an allowable range. Any one of the references may be used to check whether the signal is normal.

In the above embodiment, when the signal SA1 is determined to be normal, the calibration circuit 27 outputs the signal S2 calibrated by the signal S1. When the signal SA1 is determined to be abnormal, the signal S2 is directly output. The present invention is not limited to the particular embodiments described above. For example, the signal calibration circuit 27 may be operated as follows: (1) when the signal SA1 is determined to be normal, (A) the signal S1 is directly output, or (B) the signals S1 and S2 are alternately output on the basis of the operation control signal SC; or (2) when the signal SA1 is determined to be abnormal, (A) the signal S1 calibrated by the signal S2 is output, or (B) amplification factors (their average value or a final value) upon amplification of the signal S1 for calibration are stored in a memory or the like, the signal S2 is calibrated using a stored amplification factor, and the calibrated signal S2 is output.

In the above embodiment, the signal S2 is amplified (an amplification factor may be 1 or more or less than 1) to calibrate the signal S2. However, the signals S1 and S2 are averaged to perform a calibration operation. In addition, signal calibration can be performed by using any conventional calibration method.

When the signal SA1 is normal and one of the signals S1 and S2 is output to the signal converter 28, one of the signals S1 and S2 is arbitrarily selected in accordance with the diameter of the measuring pipe 11 and the type of fluid. For example, when an eccentric flow tends to be formed in the fluid to be measured, the signal S1 is supplied to the signal converter 28.

In each embodiment described above, the signal S2 is amplified to calibrate the signal S2. However, the present invention is not limited to this. The levels of the signals S1 and S2 may be averaged to perform a calibration operation.

In each embodiment described above, the pair of electrodes 13 are arranged in correspondence with the pair of main magnetic field generating coils 12. However, plural pairs or plurality of electrodes may be arranged. The frequency of the first excitation signal is set within the range of 4 to 8 Hz, and the frequency of the second excitation signal is set to fall within the range of 25 to 35 Hz. However, the frequencies are not limited to these values.

According to the present invention, since a magnetic field can be formed to cover almost the entire sectional area of the measuring pipe, a flowmeter almost free from an influence of an eccentric flow of the fluid can be obtained. In addition, the main magnetic flux has a low frequency, so that the rise time of the main magnetic field can be shortened regardless of the structure of the core and the outer casing and the diameter of the measuring pipe. Square wave excitation can be effectively utilized.

In the above embodiment, the 6-Hz flow rate signal is determined whether to be normal. However, the present invention is not limited to the embodiment described above. The 30-Hz flow rate signal may be checked whether to be normal. In this case, the first signal processing circuit processes the 30-Hz flow rate signal, and the second signal processing circuit 25 processes the 6-Hz flow rate signal. In this case, the signal calibration circuit 27 performs calibration by using a conventional calibration technique. Evaluation of the signal as a normal signal based on one of the 6-and 30-Hz signals is arbitrarily determined in accordance with the type of fluid to be measured and the diameter of the measuring pipe.

On the other hand, the auxiliary magnetic field generating unit uses a core having good characteristics and generates a magnetic field which covers part of the sectional area of the measuring pipe. The rise time of the auxiliary magnetic field is short regardless of the diameter of the measuring pipe, and the advantage of the square wave excitation can be effectively utilized. In addition, since the auxiliary magnetic field has a higher frequency than that of the main magnetic field, it is almost free from an influence of so-called 1/f noise.

In the above embodiment, the main and auxiliary magnetic fields are applied to the fluid independently with respect to time and positions. Eve if the frequency of the main magnetic field is close to that of the auxiliary magnetic field, the flow rate signals can be perfectly separated.

Each embodiment described above exemplifies a case wherein magnetic fields having two different frequencies are applied to the fluid to be measured. However, the present invention is not limited to this. Magnetic fields having three or more frequencies may be applied to the fluid to be measured. For example, magnetic fields having frequencies of 8 Hz, 25 to 35 Hz, and 55 to 65 Hz may be used.

According to this embodiment described above, by using the magnetic fields having two different frequencies, the advantages of the respective magnetic fields are enhanced, and their disadvantages are compensated, thereby measuring a flow rate.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. An electromagnetic flowmeter, comprising:
   measuring pipe means through which a fluid to be measured flows;
   first magnetic field generating means for forming a first magnetic field in said measuring pipe means;
   second magnetic field generating means for forming a second magnetic field having a frequency different from that of the first magnetic field in said measuring pipe means;
   first detecting means for detecting a first electromotive force signal induced by the first magnetic field;
   second detecting means for detecting a second electromotive force signal induced by the second magnetic field;
   determining means for determining whether the first electromotive force signal is normal and outputting a determination result; and
   signal processing means for outputting a signal representing a flow rate of the fluid in accordance with the determination result and in response to the first and second electromotive force signals.

2. A flowmeter according to claim 1, wherein said signal processing means comprises:
   first flow rate measuring means for generating a first flow rate designation signal representing the flow rate of the fluid on the basis of the first electromotive force signal;
   second flow rate measuring means for generating a second flow rate designation signal representing the flow rate of the fluid on the basis of the second electromotive force signal; and
   means for outputting one of the first flow rate designation signal and the second flow rate designation signal calibrated on the basis of the first flow rate designation signal when the determination result from said determining means represents a normal state.

3. A flowmeter according to claim 2, wherein said signal processing means comprises means for outputting one of the second flow rate designation signal and the first flow rate designation signal calibrated on the basis of the second flow rate designation signal when the determination result from said determining means represents an abnormal state.

4. A flowmeter according to claim 1, wherein said determining means includes at least one of means for differentiating a level of a signal and evaluating the signal as a normal signal when a differentiated value falls within a reference range, means for analyzing a frequency of the signal and evaluating the signal as the normal signal when the frequency of the signal falls within a reference range, means for detecting an amplitude or peak level of the signal and evaluating the signal as the normal signal when a detected value falls within a reference range, and means for detecting a zero level of the signal and evaluating the signal as the normal signal when the zero level falls within a reference range.

5. A flowmeter according to claim 1, further including operation control means for time-divisionally alternately operating said first magnetic field generating means and said second magnetic field generating means.

6. A flowmeter according to claim 5, wherein
   said first and second detecting means share electrodes for detecting an electromotive force signal, and
   said signal processing means comprises:
   first flow rate measuring means for generating a first flow rate designation signal representing the flow rate of the fluid on the basis of the first electromotive force signal;

second flow rate measuring means for generating a second flow rate designation signal representing the flow rate of the fluid on the basis of the second electromotive force signal; and distribution means for supplying to said first flow rate measuring means a component which is included in the electromotive force signals detected by said electrodes and is generated by the first magnetic field, and supplying to said second flow rate measuring means a component which is included in the electromotive force signals detected by said electrodes and is generated by the second magnetic field.

7. A flowmeter according to claim 1, wherein said first magnetic field generating mean is spaced apart from said second magnetic field generating means by a predetermined distance along an axis of a flow of the fluid to be measured.

8. A flowmeter according to claim 1, wherein the first magnetic field has a frequency lower than that of the second magnetic field excitation signal.

9. A flowmeter according to claim 1, wherein the first magnetic field has a frequency falling within a range of 4 to 8 Hz, and the second magnetic field has a frequency falling within a range of 25 to 35 Hz.

10. A flowmeter according to claim 8, wherein said first magnetic field generating means and said second magnetic field generating means comprise windings and magnetic paths for passing magnetic fluxes generated by said windings, respectively, said magnetic path of said first magnetic field generating means having better magnetic characteristics than those of said magnetic path of said second magnetic field generating means.

11. A flowmeter according to claim 10, further comprising an outer casing made of a magnetic material, and wherein said magnetic path of said first magnetic field generating means is mainly formed by said outer casing, and said magnetic path of said second magnetic field generating means includes an exclusive core.

12. A flowmeter according to claim 8, wherein
said first magnetic field generating means generates a magnetic field to cover a substantially entire sectional area of said measuring pipe means, and
said second magnetic field generating means generates a magnetic field to cover part of the sectional area of said measuring pipe means.

13. An electromagnetic flowmeter comprising:
path means through which a fluid to be measured flows;
first magnetic field generating means, having a first wiring and a first magnetic path, for generating a first magnetic field in said path means to generate a first electromotive force signal;
second magnetic field generating means, having a second winding and a second magnetic path, for generating a second magnetic field in said path means to generate a second electromotive force signal;
the second magnetic field having a frequency higher than the first magnetic field;
the first and second magnetic fields being independently applied to the fluid to be measured,
the second magnetic path having better magnetic characteristics than those of the first magnetic path, and
the first and second electromotive force signals being substantially free from mutual interference;

means for independently detecting the first electromotive force signal induced by the first magnetic field and the second electromotive force signal induced by the second magnetic field;
means for determining whether the first electromotive force signal is normal and outputting a determination result;
first flow rate measuring means for generating a first flow rate designation signal representing a flow rate of the fluid on the basis of the first electromotive force signal;
second flow rate measuring means for generating a second flow rate designation signal representing a flow rate of the fluid on the basis of the second electromotive force signal; and
calibrating means, responsive to the determination result from said determining means, for outputting a signal representing the flow rate of the fluid on the basis of the first and second flow rate designation signals.

14. A flowmeter according to claim 13, wherein said calibrating means comprises means for outputting one of the first flow rate designation signal and the second flow rate designation signal calibrated by the first flow rate designation signal when the determination result from said determining means represents a normal state.

15. A flowmeter according to claim 14, wherein said calibrating means comprises means for outputting one of the second flow rate designation signal and the first flow rate designation signal calibrated by the second flow rate designation signal when the determination result from said determining means represents an abnormal state.

16. A flowmeter according to claim 13, wherein said determining means includes at least one of means for differentiating a level of a signal and evaluating the signal as a normal signal when a differentiated value falls within a predetermined reference range, means for analyzing a frequency of the signal and evaluating the signal as the normal signal when the frequency falls within a predetermined reference range, and means for detecting a peak level of the signal and evaluating the signal as the normal signal when the peak level falls within a predetermined reference range.

17. A flowmeter according to claim 13, further including:
operation control means for time-divisionally alternately operating said first and second magnetic field generating means;
said detecting means having
electrodes for detecting electromotive force signals, and
distribution means for supplying the first electromotive force signal detected by said electrodes to said first flow rate measuring means and the second electromotive force signal detected by said electrodes to said second flow rate measuring means.

18. A flowmeter according to claim 13, wherein said first magnetic field has a frequency falling within a range of 4 to 8 Hz, and the second magnetic field has a frequency falling within a range of 25 to 35 Hz.

19. A flowmeter according to claim 13, further comprising an outer casing made of a magnetic material, and wherein said magnetic path of said first magnetic field generating unit is mainly formed by said outer casing, and said magnetic path of said second magnetic field generating unit is mainly formed by an exclusive magnetic path.

20. A flowmeter according to claim 13, wherein
said first magnetic field generating unit generates a magnetic field to cover a substantially entire sectional area of said measuring pipe through which the fluid to be measured flows, and
said second magnetic field generating unit generates a magnetic field to cover part of the sectional area of the measuring pipe through which the fluid to be measured flows.

21. A method for detecting a flow rate, comprising:
step of generating a first magnetic field and a second magnetic field having a frequency different from that of the first magnetic field, to a fluid to be measured;
step of detecting a first electromotive force signal induced by the first magnetic field and a second electromotive force signal induced by the second magnetic field;
step of determining whether the first electromotive force signal is normal and outputting a determination result; and
step of outputting a signal representing a flow rate of the fluid in accordance with the determination result and in response to the first and second electromotive force signals.

* * * * *